United States Patent
Salter et al.

(10) Patent No.: US 6,277,188 B1
(45) Date of Patent: *Aug. 21, 2001

(54) REFINISH PAINT CONTAINING SPECIAL EFFECT PIGMENT

(75) Inventors: Keith L. Salter, Waterville; Keith A. Starr, Delta, both of OH (US); James L. Anderson, Howell, MI (US); Daniel Guyomard, Lamorlaye (FR)

(73) Assignee: BASF Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/453,735

(22) Filed: May 30, 1995

Related U.S. Application Data

(63) Continuation of application No. 08/284,876, filed on Aug. 2, 1994, now abandoned.

(51) Int. Cl.$^7$ .................................. C09C 1/62; C08J 3/00; C08K 3/08
(52) U.S. Cl. .................... 106/403; 106/404; 106/416; 106/417; 106/499; 524/439; 524/441; 524/446; 524/449
(58) Field of Search ...................... 106/404, 416, 106/417, 403, 499; 524/441, 446, 449, 439

(56) References Cited

U.S. PATENT DOCUMENTS

| | | | |
|---|---|---|---|
| 5,204,401 | 4/1993 | Anderson, Jr. et al. | 524/441 |
| 5,320,673 | * 6/1994 | Carpenter | 106/404 |

* cited by examiner

*Primary Examiner*—Anthony Green

(57) ABSTRACT

Automotive colorcoat paint compositions containing special effect pigment are disclosed. The special effect pigments include mica and the resultant paint composition has been especially useful in refinish paints.

8 Claims, No Drawings

REFINISH PAINT CONTAINING SPECIAL EFFECT PIGMENT

This is a continuation of application Ser. No. 08/284,876 filed on Aug. 2, 1994 abandoned.

FIELD OF INVENTION

The present invention is concerned with a coating composition designed for the coating of transportation vehicles. The invention is related to coating compositions primarily for a refinish multi-coat system which includes primers and base coats, particularly with base coats containing special effect pigments. Special effect pigments include mica and can be used in the automotive refinish paint compositions according to this invention.

BACKGROUND AND PRIOR ART

Related automotive paint compositions of this type are disclosed in U.S. patent applications titled METALLIC WATER BORNE BASE COAT COMPOSITION BASED ON ACRYLIC LATEX RESINS USING A WATER REDUCIBLE RESIN FOR ALUMINUM STORAGE AND A PREGELLED HECTRORITE CLAY FOR RHEOLOGY CONTROL Ser. No. 553,065 filed Jul. 13, 1990, METALLIC WATER BORNE BASE COAT COMPOSITION BASED ON ACRYLIC LATEX RESINS USING A WATER REDUCIBLE RESIN FOR ALUMINUM STORAGE AND A TREATED HECTORITE CLAY FOR RHEOLOGY CONTROL Ser. No. 553,063 METALLIC WATER BORNE BASE COAT COMPOSITION BASED ON ACRYLIC LATEX RESINS USING AN ACRYLIC RESIN HAVING ACID AND NONIONIC FUNCTIONALITY FOR ALUMINUM STORAGE AND A PREGELLED HETORITE CLAY FOR RHEOLOGY CONTROL Ser. No. 554,606 filed Sep. 10, 1990, METALLIC WATER BORNE BASE COAT COMPOSITION BASED ON ACRYLIC LATEX RESINS USING AN ACRYLIC RESIN HAVING ACID AND NONIONIC FUNCTIONALITY FOR ALUMINUM STORAGE AND A TREATED HETORITE CLAY FOR RHEOLOGY CONTROL Ser. No. 553,100 filed Jul. 13, 1990, METALLIC WATER BORNE BASE COAT COMPOSITION BASED ON ACRYLIC LATEX RESINS AND ACRYLIC RESINS DERIVED FROM ACRYLIC MONOMERS HAVING NONIONIC, URETHANE AND ACID FUNCTIONALITY FOR ALUMINUM STORAGE AND A PREGELLED HECTORITE CLAY FOR RHEOLOGY CONTROL Ser. No. 553,069 filed Jul. 13, 1990, METALLIC WATER BORNE BASE COAT COMPOSITION BASED ON ACRYLIC LATEX RESINS AND ACRYLIC RESINS DERIVED FROM ACRYLIC MONOMERS HAVING NONIONIC, URETHANE AND ACID FUNCTIONALITY FOR ALUMINUM STORAGE AND A TREATED HECTORITE CLAY FOR RHEOLOGY CONTROL Ser. No. 553,070 filed Jul. 13, 1990, METALLIC WATER BORNE BASE COAT COMPOSITION BASED ON ACRYLIC LATEX RESINS USING ACRYLIC RESINS DERIVED FROM VINYL MONOMERS HAVING NONIONIC AND URETHANE FUNCTIONALITY FOR ALUMINUM STORAGE AND A PREGELLED HECTORITE CLAY FOR RHEOLOGY CONTROL Ser. No. 553,066 filed Jul. 13, 1990, METALLIC WATER BORNE BASE COAT COMPOSITION BASED ON ACRYLIC LATEX RESINS USING ACRYLIC RESINS DERIVED FROM VINYL MONOMERS HAVING NONIONIC AND URETHANE FUNCTIONALITY FOR ALUMINUM STORAGE AND A TREATED HECTORITE CLAY FOR RHEOLOGY CONTROL Ser. No. 553,067 filed Jul. 13, 1990, METALLIC WATER BORNE BASECOAT COMPOSITION BASED ON ACRYLIC LATEX RESINS USING ACRYLIC RESINS DERIVED FROM GRAFTING AN ISOCYANATE ADDUCT HAVING URETHANE AND NONIONIC FUNCTIONALITY ON TO AN ACRYLIC RESIN HAVING ACTIVE HYDROGEN FUNCTIONALITY FOR ALUMINUM STORAGE AND A PREGELLED HECTORITE CLAY FOR RHEOLOGY CONTROL Ser. No.553,064 filed Jul. 13, 1990, METALLIC WATER BORNE BASECOAT COMPOSITION BASED ON ACRYLIC LATEX RESINS USING ACRYLIC RESINS DERIVED FROM GRAFTING AN ISOCYANATE ADDUCT HAVING URETHANE AND NONIONIC FUNCTIONALITY ON TO AN ACRYLIC RESIN HAVING ACTIVE HYDROGEN FUNCTIONALITY FOR ALUMINUM STORAGE AND A TREATED HECTORITE CLAY FOR RHEOLOGY CONTROL Ser. No. 553,068 and ACRYLIC LATEX METALLIC WATER BORNE BASE COAT OF IMPROVED APPEARANCE Ser. No. 07/355,959 filed May 23, 1989. All of these U.S. patents and applications are incorporated herein by reference.

BACKGROUND OF THE INVENTION

It is customary in the painting of an automobile that a series of coatings be applied to the substrate. The first coat being the primer followed by the basecoat and finally a clearcoat, if desired. The basecoat provides the good decorative quality to the final finish via organic and inorganic pigments. In many automobile finishes, a metallic finish is desired. To obtain this metallic effect, metallic pigments are present in the basecoat, typically aluminum flakes. The aluminum flakes in the basecoat contribute to the glossy lustrous apperance of the final finish. More recently mica special effect pigment has been used in automotive finishes.

In the current market place, automobile coatings, especially basecoats, contain a high level of organic solvent. With increasing concern about the volatile organic emissions into the atmosphere, an intensive effort in research and development of coatings containing mainly water as the solvent with a small level of organic solvent is under way. An example of such an effort is U.S. Pat. No. 4,730,020 which discloses a water-dilutable coating composition comprising specifically selected acrylic copolymers, solvent blends, coloring and/or optical effect pigments and polymer dispersions. To obtain the desired optical effect of the metallic flakes, the correct combination of acrylic copolymer and solvent blend must be achieved. An aqueous thermosetting acrylic resin described by U.S. Pat. No. 3,862,071 controls the metallic pigment orientation by the addition of a water insoluble copolymer. Microgel technology as described by GB-PS No. 2,073,609 also results in the proper metal orientation. Also disclosed in DE No. 3,210,051 is an attempt to control metallic pigment orientation using polyurethane dispersions. Cellulosic esters have also been used to control metal fixation as disclosed in DE No. 3,216,549. The rheology modifiers or rheology control agents for water borne coatings have poor shelve stability, poor weathering characteristics and are cumbersome to use.

The use of mica in special effect OEM paint compositions is described and claimed in U.S. Pat. No. 4,557,410 issued Nov. 15, 1985. The use and desire of more and more of these special effect pigments requires the development of paint base compositions for each and every special effects pigment and for each and every paint line in the market place. This places a great cost on automotive paint suppliers since they must pay for formula development of new bases, product introduction of new formulas, warehouse stocking, customer supplying, and general formula code maintenance. The customers, paint shops and body shops, must also incur increased costs by buying more and more special effects bases to maintain their color matching capabilities. They also must find or purchase more mixing rack space to store these bases so that they are ready for use on a daily basis.

To alleviate these costs some suppliers have gone to supplying special effect pigments (ie. mica) in their dry raw and/or slightly solvent wetted forms. They reduce their formulation requirements by using the same raw micas in their different paint lines instead of formulating, producing, and supplying individual bases. This is possible due to the fact that raw or slightly wetted micas are somewhat universal and can be "stirred" into most current paint lines with few problems. This is a major change for their customers, however, since they now must learn to handle and accurately weigh dry dusty powders in place of the customary smooth flowing liquid bases. To achieve these same costs reductions and yet not subject paint jobbers and body shops to the use of dry, dusty, clumpy, and messy pigments one must seek out a special effects pigment in a form that is:

a) broadly compatible with a great majority of basecoat lines, thus one special effects base can replace or eliminate the need for many bases of the same special effect pigment.

b) liquid and easy to pour so that the customer does not have to learn to use dry dusty powders, c) and shelf stable (non-settling) so a customer need not find or purchase additional mixing rack space as newer special effects come into the marketplace.

SUMMARY OF THE INVENTION

This invention relates to paint compositions for use in colorcoat paint compositions such as basecoats and in a multicoat system for the refinishing of automobiles, trucks and buses. Typically, basecoat coating compositions for the automotive refinishing market are prepared from a kit. A basecoat kit is composed essentially of several bases or tints that, generally, contain one to five different pigments resulting in the desired color characteristic for the base or tint. The pigments according to the invention contained in the described bases or tints may consist essentially of mica flakes, as well as special effect organic pigments, inorganic pigments and other pigments leading to interesting special effects in auto paint.

A base or tint is generally prepared by combining the appropriate amount of solvent borne special effect pigment with other bases or tints of each system then the appropriate amount of water borne or solvent borne reducer is added. The resulting mixture is typically agigated for 5 to 10 minutes using a typical mixing rack used in the refinish market place or by hand. Such mixing equipment used in the automobile refinish market is described in U.S. Pat. Nos. 4,580,399 and 4,407,584 and are incorporated herein by reference.

By binder we mean the nonvolatile portion of the resinous vehicle of a coating, in particular reference is given to Paint & Coatings Dictionary, Published by The Federation of Societies for Coatings Technology, 1978. By solids we mean the nonvolatile matter in a coating composition left behind after drying, in particular reference is given to Paint & Coatings Dictionary, published by the Federation of Societies for Coatings Technology, 1978.

The water borne reducer contains an aqueous solution of; 1) synthetic sodium lithium magnesium silicate hectorite clay at a level of about 0.1 to 10% by weight, preferably 0.5 to 3.0% by weight, 2) polypropylene glycol at a level of about 0.1 to 2.0% by weight, preferably 0.1 to 1.0% by weight, 3) a water reducible resin at a level of about 0.0 to 25.0% by weight, 4) water miscible solvent at a level of about 0–25% by weight, 5) a wax level of about 0 to 10% by weight, and 5) a water level of 50–99.9% by weight.

The solvent borne reducer contains organic solvents blended to achieve the desired performance properties for each solvent borne system prepared. These organics solvent blends are comerically available and well known throughout the industry.

The coating composition can be applied using conventional spray equipment or high volume low pressure spray equipment resulting in a high quality finish. After application, the composition is dried at ambient temperatures but can also be baked at about 35–80° C. for about 5–45 minutes to form a coating layer about 0.1–2.0 mils thick.

DETAILED DESCRIPTION OF THE INVENTION

This invention is directed to a coating composition for a basecoat for the automotive refinishing of automobiles, trucks, and buses. The coating composition is prepared from a basecoat kit which consists of solvent borne special effect pigment bases, water borne or solvent borne pigmented bases and a water borne or solvent borne reducer base. This invention describes a method for the long term storage of special effect pigments for use in the automobile refinish market. The special effect pigment bases are broadly compatible with many refinish paint lines both solvent and water borne. They are fluid and pourable yet storage stable not needing to be stored on a mixing rack for daily use. The coatings described herein have sufficient stability for use in the automobile refinish market.

Special effect pigment bases that are pourable, shelf stable without stirring, and useful in a broad range of refinish systems both solvent borne and water borne are herein decribed and disclosed.

A special effect pigment base or tint is generally prepared by combining the appropriate amounts of solvents and surfactants to the base resin. This mixture is then agitated for 5 to 10 minutes using a mixer. Amorphous silica is then added and the material dispersed 15 to 30 minutes using a mixer with a dispersing type blade. The appropriate amounts of dry or solvent wetted special effect pigment and or metallic pastes are added and mixed for 15 to 30 minutes using a mixer with a propeller type blade or using a dispersing blade but at slow to moderate rate so as not to damage the flakes of pigment and/or metal.

A mica, aluminum, or other special effect pigment is used at a level of about 0.1 to 60% by weight, preferably at a level of about 25 to 50%, amorphous silica is used at a level of 0.5 to 12% by weight with the prefered level of 2 to 6%, resin at a level of about 0.1 to 60% by weight, preferably 5 to 40%, organic solvents at a level of about 0.1 to 60% by weight, preferably at a level of about 5 to 30%.

Other conventional paint additives dispersing acids, anti-settling aids, wetting aids, thickening agents, extenders, plasticizers, stabilizers, light stabilizers antifoams, defoamers, and catalysts singly or a multitude of them may be used at the conventional levels.

Commonly used metallic pigments, used singularly, or as a mixture are copper, copper alloys, aluminum, stainless steel, nickel flakes, glass flakes, dyed pigmented or coated glass flakes, mica, coated mica, flaked or ground graphite, plastic films, dyed pigmented or coated plastic films, resinous flakes, dyed pigmented or coated resinious flakes, flaked pigments and or their raw forms, and coated metallic foils, preferably aluminum flake. The aluminum flake can either be conventional aluminum flake or treated aluminum flake for hydrolytic stability. The invention applies generally to all colorants and materials showing special effect in metallic apperance in paint and particularly for those having a potential for reacting with water.

Other conventional paint additives dispersing aids, anti-settling aids, wetting aids, thickening agents, extenders, plasticizers, stabilizers, light stabilizers, antifoams defoamers, and catalysts singly or a multitude of them may be used at the conventional levels according to the invention.

The amorphous silica such as those which are produced by hydrolysis of silicon tetrachloride in an oxygen-hydrogen flame are used. These can be either the hydrophillic or the hydrophobic types with the hydrophobic types with BET-surface of ~120 m²/g and primary particle size average of ~16 millimicrons prefered.

The water reducible resins can be selected from the group consisting essentially of acrylic, alkyds, acrylic modified alkyds, polyurethane modified alkyds, polyester, polyurethane, grafted acrylic polyurethane and acrylic containing urethane resins. The solvent borne water reducible resin should have an acid number of 10 to 150 mg KOH/g of solid resin, a hydroxyl number of 0 to 120, a molecular weight of 2,000 to 100,000 number average, Tg range of −40° C. to 50° C. The acid groups of the resin are neutralized with an amine. The amine can be selected from the group consisting essentially of ammonia, diethyl amine, triethyl amine, ethanolamine, diethanolamine, triethanolamine, n-methylethanol amine, N.N diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, n,N-diethylaminoethylamine, ethylene diamine, diethylene triamine, diethylene tetraamine, hexamethylene tetramine, triethylamine, dimethylethanolamine and the like.

The organic solvent can be selected from the group consisting essentially of methyl ethyl ketone, acetone, ethanol, methanol, propanol, butanol, N-methylpyrolidone, napthas, 2,2,4-trimethyl-1,3-pentanediol monoisobutyrate, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene glycol methyl ether, propylene glycol methyl ether acetate, propylene glycol ethyl ether, propylene glycol ethyl ether acetate, propyleneglycol propyl ether, propylene glycol butyl ether, propylene glycol t-butyl ether, propylene glycol hexyl ether, dipropylene glycol methyl ether, dipropylene glycol ethyl ether, dipropylene glycol propyl ether, methyl ethyl ketone and dipropylene glycol butyl ether and the like.

The water borne reducer base is an aqueous solution containing a dispersion of synthetic sodium lithium magnesium silicate hectorite clay, a polypropylene glycol, water borne resin and optionally wax. The typical properties of the synthetic sodium lithium magnesium silicate clay are as follows:

| | |
|---|---|
| Solids Content, % Typical Analysis | 95–100 |
| SiO2 | 50–65 |
| MgO | 25–35 |
| Li2O | 0.1–1.5 |
| Na2O | 1.5–3.5 |
| | 3.0–12.0 |
| Appearance | White free flowing powder |
| Particle Size | <2% greater than 250 microns |
| Surface Area, m2g | 370s |

Especially preferred synthetic sodium lithium magnesium silicate hectorite clay is Laponite RD, available from Laporte, Inc. This hectorite clay is present in this component at a level of about 0.1–10% by weight, preferably 0.5–3.0% by weight. The hectorite clay can be dispersed in the aqueous medium by Cowles or agitation.

The polypropylene glycol is at a level of about 0.1–10% by weight. The molecular weight range of the polypropylene glycol is 435 to 3900.

This component may also contain a water reducible resins, acrylic latex resins or combinations thereof at a level of about 0.0–45.0% by weight, preferably 0.0–25.0% by weight.

The water reducible resins can be selected from the group consisting essentially of acrylic, alkyds, acrylic modified alkyds, urethane modified alkyds, polyester, polyurethane, grafted acrylic polyurethane and acrylic containing urethane resins. The solvent borne water reducible resin should have an acid number of 10 to 150 mg KOH/g of solid resin, a hydroxyl number of 0 to 120, a molecular weight of 2,000 to 100,000 number average, Tg range of −40 C. to 50 C. The acid groups of the resin are neutralized with an amine. The amine can be selected from the group consisting essentially of ammonia, diethyl amine, triethyl amine, ethanolamine, diethanolamine, triethanolamine, n-methylethanol amine, N,N diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetraamine, hexamethylene tetramine, triethylamine, dimethylethanolamine and the like.

Typical properties of the acrylic latex in the water borne reducer base are as follows:

| | |
|---|---|
| Solids content, % | 20–60 |
| pH | 7 to 10 |
| Weight per gallon, lbs | 8.0 to 9.0 |
| Minimum film formation temperature, C. | 0 to 70 |
| Sward hardness | 25 to 110 |
| Mechanical stability | OK |
| Glass transitition temperature, C. | 10 to 50 |
| Average molecular weight | 150,000 to 300,000 |
| Number average molecular weight | 30,000 to 60,000 |
| Acid number on solids | 5 to 80 |
| Hydroxyl number on solids | 0 to 120 |
| Volatile organic solvents, % | 0 to 20 |
| Particle size, nm | 50 to 150 |

Also present in this component is an organic solvent selected from the group consisting essentially of methyl ethyl ketone, acetone, ethanol, methanol, propanol, butanol, N-methylpyrolidone, napthas, 2,2,4-trimethyl-1,3-pentanediol monoisobutyrate, glycols, glycol ethers, glycol acetates, diethylene glycol ethers, diethylene glycol acetates, propylene glycol ethers, propylene glycol acetates, dipropylene glycol ethers, dipropylene glycol acetates, specially preferred are ethylene glycol propyl ether, ethylene glycol butyl ether, ethylene glycol hexyl ether, propylene glycol methyl ether, propylene glycol methyl ether acetate, propylene glycol ethyl ether, propylene glycol ethyl ether acetate, propylene glycol propyl ether, propylene glycol butyl ether, propylene glycol hexyl ether, dipropylene glycol methyl ether, dipropylene glycol ethyl ether, dipropylene glycol propyl ether and dipropylene glycol butyl ether at a level of about 0–25% by weight, preferably 0–12% by weight. The total water content of this component is 50–99.9% by weight.

The water borne reducer base can also contain wax. Typical properties of this wax are as follows:

| Acid Number (mg KOH/g) | 0–50 |
|---|---|
| Hardness, dmm (ASTM D-5) | <2.0 |
| Mettler Drop Point, C (ASTM D-3104) | 100–150 |
| Particle Size, micron | 0.01 to 10.0 |
| Hydroxyl Number | 0–50 |

The wax is emulsified into water at a particle size of 0.01 microns to 50.0 microns using conventional techniques. The level of wax in the water borne reducer base is 0 to 10% by weight of the base.

The water borne reducer base may also contain other conventional paint additives dispersing aids, anti-settling aids, wetting aids, thickening agents, extenders, plasticizers, stabilizers, light stabilizers, antifoams, defoamers and catalysts singly or a multitude of them at the conventional levels.

Other water reducible resin may be added to the coating to improve certain film properties such as aqueous one-component aliphatic polyurethane dispersions, aromatic polyurethane dispersions, polyesters, and alkyds.

Addition of an acrylic acid and/or polyurethane based thickeners known to the art may also be added to achieve desired properties. The incorporation of metal oxides such as zinc oxide may also improve the physical properties of the final film by crosslinking with the acid groups on the resin system. Other modes of crosslinking the basecoat composition include carbodiimides and/or polyfunctional aziridines.

Additional anionic and nonionic surfactants can be added to the paint composition to increase wetting of the substrate by the coating such as FC-120, FC-430 sold by 3M, Surfynol 104, Surfynol 440 sold by Air Products, Triton X-100 sold by Rohm and Haas, Troysol LAC sold by Troy Chemical Company, Aerosol OT's sold by American Cyanamid including the salts of dialkyl sulfosuccinates and Igepal's sold by GAF including the ethoxylated alkyl phenols.

The following examples are intended to illustrate the invention:

EXAMPLE 1
Preparation of Polyester

A reactor fitted with agitator, addition ports, reflux condenser, thermocouple probe, Barrett trap, and inert gas inlet was charged, under nitrogen (a low stream of nitrogen entering reactor through inert gas inlet), with the following commercially available materials: 17942 parts by weight Empol 1008 dimer fatty acid, 5150 parts by weight isophthalic acid, 9570 parts by weight 1,6-hexanediol, 437 parts by weight toluene. The reactor was heated to 132–142° C. with agitation. A light stream of nitrogen continued to pass through the system. The batch heating was slowly continued to 150–158° C., collecting water condensate in the Barrett trap. After a temperature of about 150–158° C., toluene was prevented from returning to the batch and temperature allowed to rise. Condensate from ester formation continued to be collected keeping temperature below a maximum of 210–220° C.; acid number was checked at intervals. At about 5–6 acid number, heat was turned off and vacuum (about 26–28 inches) slowly applied to strip off the solvent and water remaining in batch (caution: material may foam). After distillate rate substantially ceased, the vacuum was broken with nitrogen, and the batch cooled. Properties of the material were 4–5 acid number; viscosity and color when reduced to 81–82 percent non-volatile with methyl propyl ketone of U-W (Gardner-Holdt) and 1-2 (Gardner) respectively.

EXAMPLE 2
Preparation of Polyurethane Polymer

Part A

A reactor fitted with agitator, addition ports, reflux condenser, thermocouple probe, and inert gas inlet was charged, under nitrogen (a low stream of nitrogen entering reactor through inert gas inlet), with 13018 g. of the (unreduced) polymer of EXAMPLE 1 (approximately 98% non-volatile) and the following commercially available materials: 1093 g. of dimethylol propionic acid, 189 g. neopentylglycol, 4499 g. urethane grade methyl ethyl ketone, and 5500 g. TMXDI (META) (tetra methyl xylene aliphatic diisocyanate from Cyanamid). The batch was heated to 89–92° C. and maintained at that temperature range for four to five hours. The heat was turned off, nitrogen left at a trace flow, and the batch allowed to sit two to three days.

Part B

The batch was heated to 89–91° C. and during this heating, a sample was removed from the batch (still under a trace of nitrogen) for isocyanate value determination. The batch was held at 89–91° C. for about 2–3 hours, monitoring isocyanate value until it remained fairly constant at about 1.0–1.2 percent (the isocyanate value was reported on solution by back-titration of about a 2–4 g. sample dissolved in toluene, reacted with approximately 0.6 M dibutylamine, with an approximately 0.5 M HCl solution; acetone was used for the back-titration solvent after the isocyanate reaction). In addition, during the hold period, non-volatile was determined. Prior to adjustment the viscosity was 3.4–3.7 poise when reduced approximately 1:1 with N-methyl pyrolidone (NMP) using an I.C.I. Cone and Plate viscometer set at 25° C. Approximately at least 11 g. were removed for the various samplings.

Subsequently 530 g. of trimethylol propane was added to the batch (the temperature of which had dropped to 87° C.). Also about 45 g. of methyl ethyl ketone was added (which was the amount which approximately adjusted it to theoretically 80–81 percent non-volatile prior to trimethylol propane addition using the non-volatile value obtained above).

Part C

The batch was held with enough heat to allow it to maintain a temperature of 87–92° C. and viscosity checked through the hold (using the procedure described above with NMP) until a value of 12 to 15 poise was obtained. About a minimum of 20 g. of material was removed from the batch for samples in this Part. At 12 to 15 poise, 450 g. of ethanol was pumped into the bottom of the reactor, the reactor cooled to less than 81° C., nitrogen turned off, and allowed to agitate overnight. Subsequently 3527 g. of methyl ethyl ketone was added. To improve mixing, 426 g. were removed from the reactor.

EXAMPLE 3
Preparation of Polyurethane Water Borne Dispersion

A reactor fitted with agitator, addition ports, reflux condenser, thermocouple probe, and inert gas inlet with a nitrogen flow was charged with 8003 g. of the material of EXAMPLE 2. The non-volatile was determined [with methyl isobutyl ketone and 0.2–0.4 g. sample at 105–115° C. for about 60 minutes (approximately 3 g. were removed for this test)] to be 72–73 percent. The batch was heated to about 80–86° C. and vacuum stripped at about −2 inches of mercury gage (the nitrogen flow was turned off at about 56° C.). After about 900–1000 g. of solvent were collected, 1273 g. of Propasol M was added. Vacuum distillation continued, and temperature allowed to increase to about 90–93° C. The refractive index of the distillate was monitored until it was greater than 1.4010 at 20° C. after which distillation was stopped.

The batch was heated to 100° C. and 171.8 g. of dimethyl amino ethanol was added. The batch was allowed to agitate with temperature between 93 and 110° C. (for about 42 minutes) with the temperature remaining between 97–101° C. most of the time.

Subsequently 11,419 g. of deionized water was added over about one hour. Temperature dropped to 84° C. The batch was cooled.

The properties of the resin were 31–32 percent non-volatile (0.2–0.4 g. sample, with an appropriate solvent such as water, for 60 minutes at 105–115° C.); 24–26 acid number based on the above non-volatile, pH of 7.0–7.5. Differences between determined non-volatile and theoretical are likely the result of losses during processing.

EXAMPLE 4
Preparation of Solvent Borne Polyurethane

Part A

A reactor fitted with agitator, addition ports, reflux condenser, thermocouple probe, and inert gas inlet was charged, under nitrogen (a low flow of nitrogen entering reactor through inert gas inlet), with 13018 g. of the (unreduced) polymer of EXAMPLE 1 (approximately 98% non-volatile) and the following commercially available materials: 1093 g. of dimethylol propionic acid, 189 g. neopentylglycol, 4457 g. urethane grade methyl ethyl ketone, and 5500 g. TMXDI (META) (tetra methyl xylene aliphatic diisocyanate from Cyanamid). The batch was heated to 89–92° C. and maintained at that temperature range for one to two hours. The heat was turned off, nitrogen left at a trace flow, and the batch allowed to sit overnight.

Part B

The batch was heated to 89–91° C. and during this heating, a sample was removed from the batch (still under nitrogen) for isocyanate value determination. The batch was held at 89–91° C. for about 6–7 hours, monitoring isocyanate value until it remained fairly constant at about 1.2–1.4 percent (the isocyanate value was reported on solution by back-titration of about a 2–4 g. sample dissolved in toluene, reacted with approximately 0.2 M dibutylamine, with an approximately 0.1 M HCl solution; isopropanol was used for the back-titration solvent after the isocyanate reaction). The heat was turned off, nitrogen left at a trace flow, and the batch allowed sit overnight.

The batch was heated to 89–91° C. and during this heating, a sample was removed from the batch (still under a trace of nitrogen) for non-volatile determination. The batch was held at 89–91° C. for about 1–2 hours, monitoring isocyanate value until it remained fairly constant at about 1.1–1.3 percent.

Subsequently 558 g. of trimethylol propane was added to the batch. Also about 334 g. of methyl ethyl ketone (which was the amount approximately adjusting it to theoretically 80–81 percent non-volatile prior to trimethylol propane addition). Prior to adjustment the viscosity was 3.8–4.3 poise when reduced approximately 1:1 with N-methyl pyrolidone (NMP) using an I.C.I. Cone and Plate viscometer set at 25° C. Approximately a minimum of at least 16 g. were removed for the various samples of this step.

Part C

The batch was held with enough heat to allow it to maintain a temperature of 89–91° C. and viscosity checked through the hold (using the procedure described above with NMP) until a value of 11 to 15 poise was obtained. At 11 to 15 poise, 474 g. of ethanol was added to the reactor and mixed thoroughly over several days. Approximately a minimum of at least 49 g. were removed for the various samples of this step. Subsequently 7780 g. was removed from the reactor and 2617 g. of Propasol M added to the remaining material.

Part D

The non-volatile content of the material remaining in the reactor was determined [0.2–0.4 g. sample at 105–115° C., with an appropriate solvent, for 3–4 hours (approximately 5 g. were removed for this test)] to be 69–71 percent. The batch was heated to about 100° C. while being vacuum stripped at about −2 to −9 inches of mercury gage. The refractive index of the distillate was monitored until it was greater than 1.4005 (at 20° C.) after which distillation was stopped, 5829 g. of Propasol M added, the batch cooled, and allowed to set overnight.

The batch was heated to 100° C. and 410.7 g. of dimethyl amino ethanol was added. The batch was allowed to agitate with temperature between 99–101° C. for about 39 minutes.

The properties of the resin were 62–64 percent non-volatile [with an appropriate solvent such as toluene, and 0.2–0.4 g. sample at 105–115° C. for about 60 minutes; 24–25 acid number based on the above non-volatile, reduced viscosity (to about 40.5 percent with NMP) of 13.6 poise using the I.C.I. Cone and Plate viscometer described above. Differences between determined non-volatile and theoretical are likely the result of losses during processing.

EXAMPLE 5
Preparation of the Special Effect Resin Base

The resin base for use with the concentrated stable special effects bases made as follows: 3,450 g of solvent borne polyurethane resin, Example 4, were weighed then 61 g dimethylethanolamine, 539 g Surfynol 104BC, and 2629 g M-Pyrol were added and mixed together completely using an air mixer equipped with a cowles type disperser blade. After proper mixing was achieved, 600 g of Aerosil R-972 was added and then mixed in until completely wetted. At this point the mixing was increased to achieve a good dispersing action from the cowles type blade. The dispersion phase lasted for 15 minutes during which time the temperature increased to 107° F. and the Aerosil R-972 was dispersed. 1776 g of M-Pyrol were than added and mixed in completely to reduce the mixture to proper formulation. The final resin base has the values of 6.626% pigment, 23.622% resin, 66.775% organic solvents, 3.650% additives and a final non-volatile content of 33.225% with a VOC of 5.855 lbs./gallon.

EXAMPLE 6
Preparation of the Concentrated Broadly Compatible Stabilized Special Effects Base A concentrated broadly compatible stabilized special effects base was prepared as follows: 588.6 g of the previously prepared resin base, Example 5, were weighed then 61.4 g of M-Pyrol were added and the two completely mixed using an air mixer equipped with a cowles type disperser blade. Then 350 g of Mearl's 839Z exterior grade mica was added and mixing continued until mica was well wetted. Mixing at a moderate speed was then continued for an additional 10-minutes to further disperse and wet the mica flakes. The special effects base has final values of 38.9% pigment, 19.904% resin, 45.444% organic solvents, 2.148% additives and a final non-volatile content of 54.546% with a VOC of 5.246 lbs./gallon. Viscosity of this concentrated special effects base was 1,172 cps using a Brookfield RVT viscometer with a #5 spindle at 100 RPMs.

EXAMPLE 7
Preparation of the Water Borne Reducer Base

The reducer was made by adding to 342.73 g of deionized water, 3.55 g of P1010 manufactured by BASF. The resulting solution was then agitated for one half hour. To this solution 8.88 g of Laponite RD manufactured by Laporte Industries was added slowly. The entire solution is stirred for one hour. Then 236.84 g of deionized water was added to the solution and it was mixed for 30 minutes.

Under moderate agitation 286.2 grams of deionized water was added to 592 g of the above mixture. Under continued agitation 114.93 grams of the earlier described aqueous polyurethane dispersion of EXAMPLE 3 was added slowly added. To this solution, 6.87 g of a 1% FC-120 intermediate, which is made by mixing 92 g of deionized water, 4 g of butyl cellusolve, 4 g of FC-120 surfactant made by 3M, was added. The resultant reducer has a clay level of 0.9% by weight, a resin level of 3.9% by weight, a volatile organic level of 0.9% by weight, a nonvolatile level of 4.8% by weight, a water level of 94.3% by weight and a VOC of 1.53 lbs/gal.

EXAMPLE 8
Preparation of a Ready for Use Solvent Borne Refinish Paint Using the Special Effect Pigmented Base A typical ready for use automotive refinish paint has been prepared using the previously described concentrated stabilized special effects base as follows: 10.0 g of concentrated special effects base, Example 6, are weighed and 35.0 g of BASF's BC-100 Diamont base added. Then 5.0 g of BASF's BC-200 black base was added and all were mixed together by hand using a small spatula til uniform. Then 50 g of BASF's BR-50 reducer was added and again all was mixed by hand til uniform. This ready for use paint has final values of 3.978% pigment, 7.936% resin 87.422% organic solvents, 0.704% additives, and a non-volatile content of 12.578% with a VOC of 6.69 lbs./gallon.

EXAMPLE 9
Preparation of a Ready for Use Water Dispersed Refinish Paint Using the Special Effect Pigmented Base A ready for use automotive refinish paint has been prepared using the previously described concentrated stabilized special effects base as follows: 10.0 g of concentrated special effects base, Example 6, are weighed and 90.0 g of Water Borne Reducer, Example 7, are added then the mixture is mixed together by hand using a spatula until uniform.

The coating composition can be applied using conventional spray equipment or high volume low pressure spray equipment resulting in a high quality finish. After application, the composition is dried at ambient temperatures but can also be baked at about 35–80° C. for about 5–45 minutes to form a coating layer about 0.1–2.0 mils thick. The base coat was allowed to flash for 30 minutes after the last coat and then clear coated with a transparent coating based on isocyanate technology.

We claim:

1. A special effect pigment base for use with a waterborne or solventborne coating comprising a mixture of:
   (i) special effect pigment selected from the group consisting of mica and metallic pigments, present in an amount between 0.1 to 60% by weight based on total weight of the pigment base,
   (ii) water reducible solvent borne polymeric resin having an acid number between 10 and 150 mg KOH/g of solid resin, a hydroxyl number of between 0 and 120, a molecular weight of between 2,000 and 100,000 and a Tg between −40° C. and 50° C., selected from the group consisting of acrylic, alkyds, acrylic modified alkyds, polyurethane, grafted acrylic polyurethane and acrylic polyurethane resins and mixtures thereof,
   (iii) amorphous silica present in an amount between 0.5 to 12.0% by weight based on total weight of the pigment base, and
   (iv) organic solvent present in an amount between 0.1 to 60.0% by weight based on total weight of the pigment base.

2. The special effect pigment base of claim 1, wherein the pigment is a metallic pigment.

3. The special effect pigment base of claim 1 wherein the pigment is mica.

4. The special effect pigment base of claim 1 wherein the pigment is aluminum flake.

5. The special effect pigment base of claim 4, wherein the aluminum flake pigment is stable in water.

6. The special effect pigment base of claim 1, wherein the solvent borne polymeric resin is polyurethane.

7. A waterborne basecoat paint composition comprising
   (a) a special effect pigment base according to claim 1 and
   (b) a water borne reducer base comprising an aqueous solution of
       (i) 0.1 to 10% hectorite clay,
       (ii) 0.1 to 10% by weight polypropylene glycol,
       (iii) up to 45% by weight of a water reducible resin selected from the group consisting of acrylic, alkyd, acrylic modified alkyd, urethane modified alkyls, polyester, polyurethane grafted acrylic polyurethane and acrylic containing urethane resins, and
       (iv) water present in an amount between 50 and 99.9% by weight, where all weights are based on total reducer base weight.

8. A solvent borne basecoat paint composition comprising
   (a) a special effect pigment base according to claim 1, and
   (b) solvent borne reducer base comprising a mixture of
       (i) a resin selected from the group consisting of acrylic, alkyd, acrylic modified alkyd, urethane modified alkyls, polyester, polyurethane grafted acrylic polyurethane and acrylic containing urethane resins, and
       (ii) solvent.

* * * * *